Patented Dec. 22, 1931

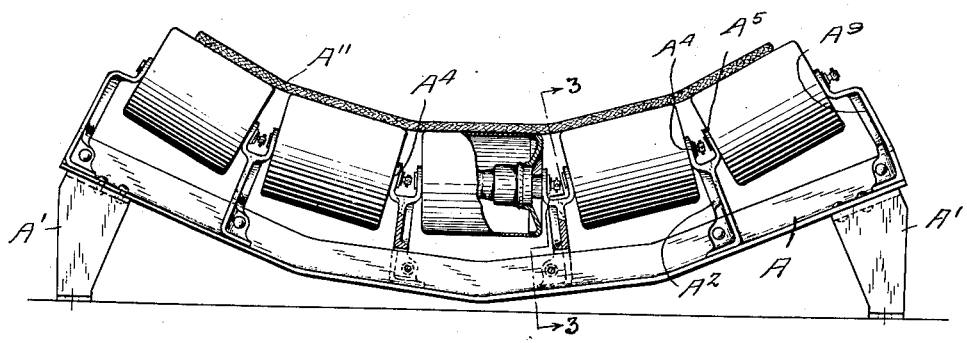
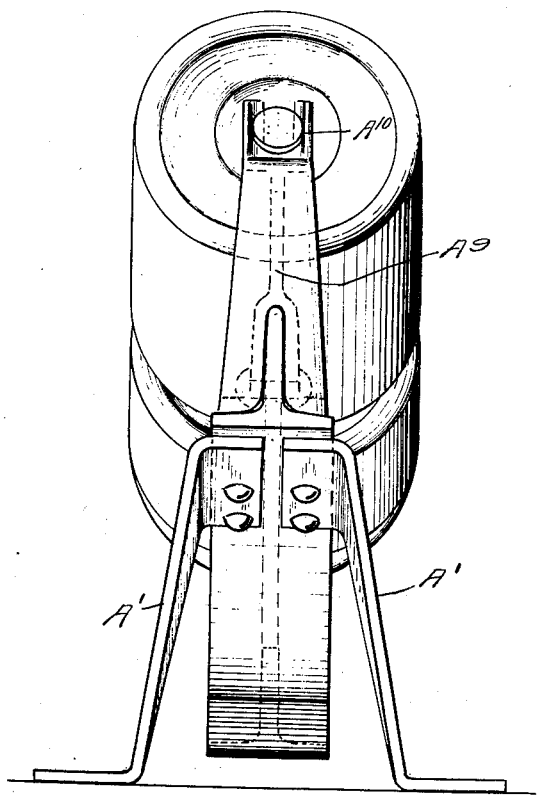
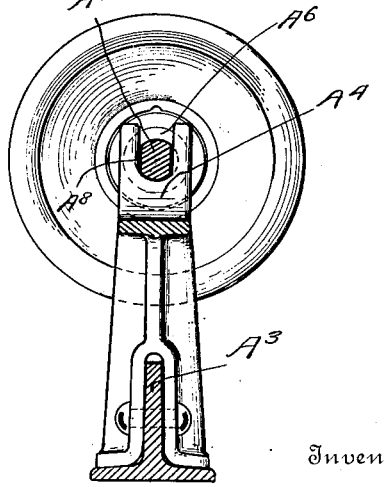

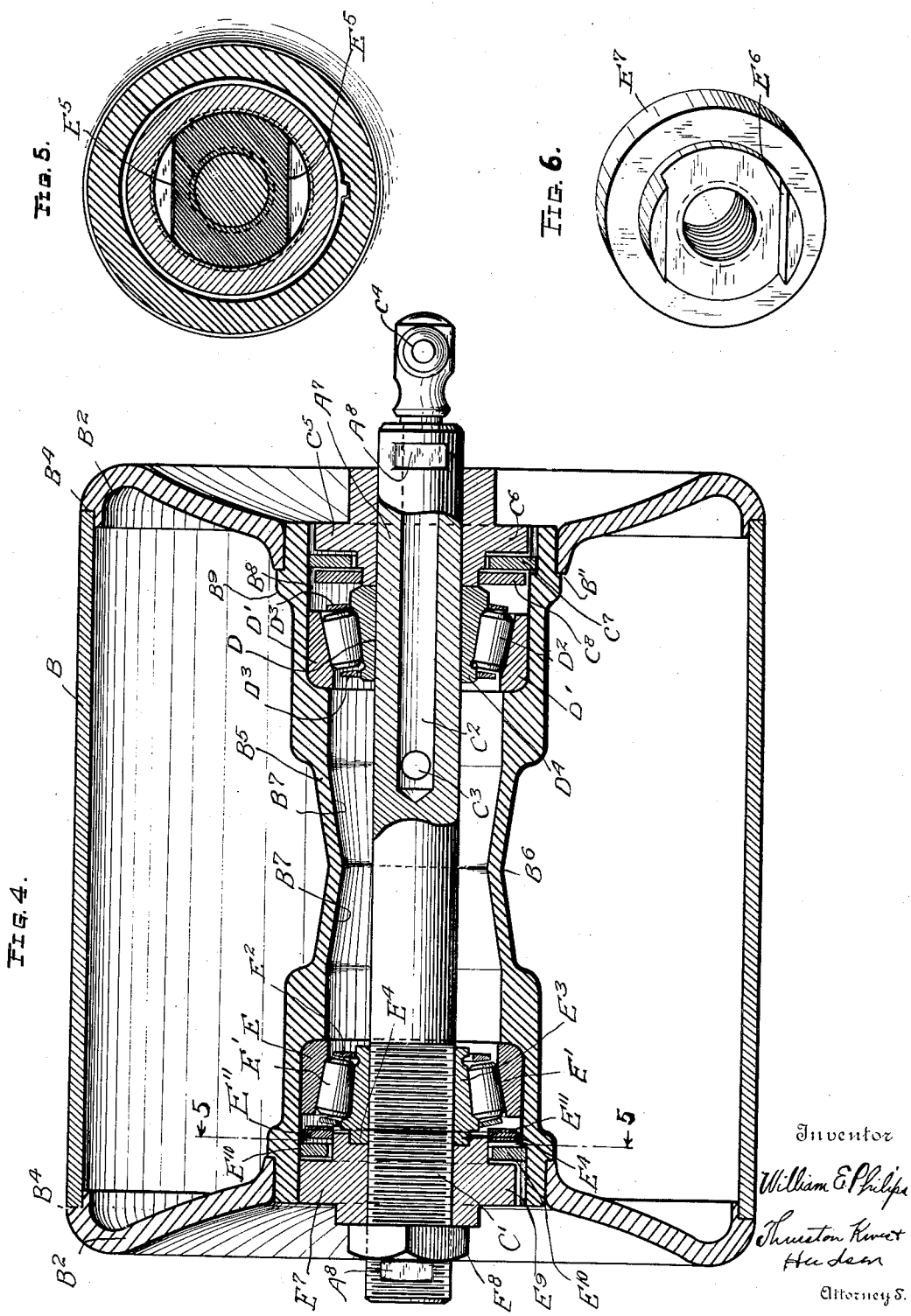

1,837,480

UNITED STATES PATENT OFFICE

WILLIAM E. PHILIPS, OF CHICAGO, ILLINOIS, ASSIGNOR TO LINK-BELT COMPANY, OF CHICAGO, ILLINOIS, A CORPORATION OF ILLINOIS

CONSTRUCTION FOR ROLLERS AND THE LIKE

Application filed September 17, 1924, Serial No. 738,115. Renewed March 21, 1929.

The present invention relates to a roller which is particularly designed for use with belt conveyors, although the structure involved is capable of use in other connections, as, for instance, in pulleys, wheels, etc.

The object of the invention is to produce a roller in which the bearings of the roller are adjustable from one end thereof, whereby a single adjustment will tighten or loosen both bearings of the roller.

A further object of the invention is to provide a roller having a hub of such construction that the hub may serve is a lubricant reservoir, lubricant being delivered to the interior of the hub and moving outward through the bearings, and, furthermore, the hub is so constructed that the centrifugal force developed during the rotation of the roller will tend to move the lubricant toward the bearing.

A further object of the invention is to provide a tortuous passage for the lubricant as it passes beyond the bearings, so that there will be no tendency for the lubricant to rapidly leave the bearings after passing through the same.

A further object of the invention is to provide a mounting for a plurality of rollers, so constructed that it operates to clear the rollers of matter that may accumulate on the rollers during their operation.

Other objects of the invention will appear as the description proceeds.

My invention is illustrated more or less diagrammatically in the accompanying drawings, wherein—

Figure 1 is an elevation with parts in section of a set of troughing idlers;

Figure 2 is an end elevation;

Figure 3 is a section along the line 3—3 of Figure 1;

Figure 4 is a longitudinal section through a roller;

Figure 5 is a section along the line 5—5 of Figure 4; and

Figure 6 is a perspective view of a bearing adjustment nut.

Like parts are indicated by like characters throughout the specification and drawings.

A is a troughing idler frame mounted on legs $A^1$. Projecting upwardly from this frame are a series of brackets $A^2$. These brackets straddle the web $A^3$ of the frame. Each of these brackets is bifurcated as at $A^4$ $A^5$ and these bifurcated arms are slotted at at $A^6$ to receive an idler roll spindle $A^7$ which spindle is flattened as indicated at $A^8$ to engage the slot and position the spindle against longitudinal and rotary movement. At the ends of the frame are brackets $A^9$ having inwardly and upwardly extending slotted arms $A^{10}$ which hold the outer ends of the spindles on the two outermost rollers. $A^{11}$ is a conveyor belt troughed by the rollers.

In Figures 4, 5 and 6 are shown the details of the roller itself. B is a cylindrical body opened at both ends. $B^2$ $B^2$ are annular heads closing the open ends of the body. Each head is provided about its outer periphery with a flange $B^3$ curving into parallelism with the axis of the body B and cut away as indicated at $B^4$ to engage the ends of the cylinder body B and support the cylinder body B with its working face in prolongation of the curved outer face of the flange so as to provide a smooth continuous surface to engage the belt. $B^5$ is a sleeve extending longitudinally of the axis of the cylindrical body. It is centrally reduced as at $B^6$ to provide outwardly flaring opposed interior conical walls $B^7$ and at the ends of the sleeve is interiorly increased in diameter to form sockets $B^8$. The ends of the sleeve are flanged as at $B^9$ and penetrate the central apertures of the heads $B^2$ the flanges engaging flanges $B^{11}$ around said apertures to limit inward movement of the head and lock the parts together so that the sleeve, the annular heads, and the cylindrical body may in effect form a permanently assembled unit.

The spindle $A^7$ is threaded at one end at $C^1$, provided with a central longitudinal passage $C^2$ communicating with a transverse passage $C^3$ discharging into the space within the sleeve and provided with a fitting $C^4$ by which grease may be forced through the passages into the interior of the sleeve about the spindle. $C^5$ is a hub rigidly mounted on the spindle $A^7$. It is flanged at $C^6$, the flange extending substantially out to the periphery of and closing the open mouth of the socket B⁸ but of course out of contact with it. Extending inwardly from the periphery of the socket B⁸ parallel with the flange C⁶ is a grease ring C⁷ and this ring is in relation with a ring C⁸ on the hub C⁵, the two rings and the flange C⁶ making together a labyrinthine packing affording a tortuous passage through which grease can, if it escapes at all, escape but with difficulty from the bearing.

D is the inner race of a roller bearing, D¹ the outer race tightly socketed in the socket B⁸. D² are anti-friction members interposed between these two races. In this case they take the form of tapered rollers associated with a roller cage D³, the two races being tapered to conform to the rollers. This race D is provided with an extension D⁴ extending outwardly beyond the anti-friction bearing area to engage the hub and space the anti-friction rollers from the labyrinthine passage to provide a grease pocket on the outside of the bearing.

At the other end of the roller E is an outer race socketed in the opposed socket B⁸. Associated with it are tapered anti-friction rollers E¹ and a roller cage E². E³ is an inner race also tapered to conform to the rollers. This race may be threaded interiorly to engage the threaded portion C¹ of the spindle. This race also has an extension E⁴ having flattened faces E⁵ adapted to be engaged by lugs E⁶ on the adjusting nut E⁷ which nut is threaded on the spindle C¹ so that when the nut is rotated the interlocking of the lugs and flattened faces causes rotation of the race and moves it inwardly or outwardly as the case may be to tighten or loosen the adjustment of the bearings. This adjusting nut is working in opposition to a fixed abutment through the two roller bearings and the supporting sleeve so that one adjustment of the nut simultaneously adjusts both of the bearings. E⁸ is a lock nut threaded on the spindle adapted to lock the adjusting nut in place. This adjusting nut E⁷ is flanged at E⁹ similar to the flange C⁶ on the hub C⁵ and there is associated with this nut a packing ring E¹⁰ projecting inwardly from the wall of the socket and a ring E¹¹ extending outwardly from the adjusting nut and rotating with it so as to provide a similar labyrinthine packing.

It will be evident that where I have shown in the drawing an operative device, still many changes might be made in the specification and claims without departing from the spirit of my invention and I wish, therefore, that my drawings be regarded as in a sense diagrammatic.

The use and operation of my invention are as follows:

The roller and bearing assembly is habitually brought together in the shop before being installed as a part of a belt conveyor. The parts are assembled as indicated. The adjusting nut is drawn up to make the proper adjustment on the bearings, the lock nut locks the parts together and grease is forced in to fill the interior of the sleeve, the bearings and the grease pockets at the ends of the bearings bounded by the labyrinthine packing. Thus under ordinary conditions no adjustment is required when assembling in the field.

When the roller is about to be placed in service the spindle is supported on the slotted brackets, the flattened portions in the spindle insuring proper positioning and preventing rotation of the spindle. As the roller rotates centrifugal force tends to cause a feed of grease outwardly toward each end from the center of the sleeve, the grease traveling by centrifugal force along the inner walls. Since the interior is relatively smooth and the outer ball race substantially in line with the sleeve this feed of grease is not prevented by anything within the housing and as long as there is any grease available it will be fed out to lubricate the anti-friction members.

Because there is but a small clearance between the sleeve and the spindle there is not room for any large masses of grease and the grease is generally distributed throughout the interior of the spindle. This is of great importance in connection with belt conveyors especially those exposed to the elements because where large grease reservoirs are used experience shows that the warm grease resulting from operation tends when the plant shuts down to flow to the bottom of the roller and there to congeal. When the plant starts up again great trouble results from the unbalanced effect of these masses of hard grease concentrated eccentrically of the roller. By my arrangement all the grease is concentrated at a point relatively close to the axis of rotation so that disadvantage is reduced to a minimum.

Having described my invention, I claim:

1. In a device of the character described, the combination of a hollow drum-like member having a centrally arranged tubular hub member, a spindle extending axially through said hub, bearing rings mounted in said hub adjacent the end portions thereof, bearing rings also mounted upon said spindle and bearing members mounted between the said rings, one end of said spindle being threaded, and one of the bearing rings being mounted upon said threaded portion, a member mounted upon the threaded portion of the spindle and having a turning engagement with the bearing ring which is mounted upon the threaded portion of the spindle whereby rotation of the said member causes the rotation of the bearing ring, and means for holding the said member in adjusted position upon the spindle.

2. In a device of the character described, the combination of a drum-like member having a hollow hub, a spindle extending axially with respect to said hub, bearing rings mounted in the hub adjacent the opposite end thereof, other bearing rings mounted upon the spindle and bearing members between the said bearing rings, one end of said spindle being threaded and one of the bearing rings being mounted upon said threaded portion, said bearing ring having an extension with flat sides, and a member mounted upon the threaded portion of the spindle, said member having oppositely disposed extensions with flat sides which engage with the flat sides on the bearing ring whereby rotation of said member causes rotation of the bearing.

In testimony whereof, I hereunto affix my signature.

WILLIAM E. PHILIPS.